United States Patent
Rettig et al.

[15] 3,645,074
[45] Feb. 29, 1972

[54] AGRICULTURAL IMPLEMENT

[72] Inventors: Vernon Eugene Rettig, Bondurant; John Edward Maust, Jr., Des Moines; Joseph John Shindelar, Ottumwa, all of Iowa

[73] Assignee: Deere & Company, Moline, Ill.

[22] Filed: Oct. 26, 1970

[21] Appl. No.: 83,751

[52] U.S. Cl. ................................56/14.6, 56/DIG. 9, 214/515
[51] Int. Cl. ..................................................A01d 45/02
[58] Field of Search................56/14.6, 2, DIG. 9; 214/515, 214/390, 396

[56] References Cited

UNITED STATES PATENTS

| | | | |
|---|---|---|---|
| 2,401,183 | 5/1946 | Pool et al. | 56/DIG. 9 |
| 3,159,956 | 12/1964 | Green et al. | 56/DIG. 9 |
| 3,425,194 | 2/1969 | Stott et al. | 56/DIG. 9 |

FOREIGN PATENTS OR APPLICATIONS 1,069,416  11/1959  Germany ...........................56/DIG. 9

Primary Examiner—Antonio F. Guida
Attorney—H. Vincent Harsha, Harold M. Knoth, William A. Murray, John M. Nolan, Raymond L. Hollister and Jimmie R. Oaks

[57] ABSTRACT

A crop-treating device composed of an elongated fore-and-aft extending crop-treating implement and an implement carrier that bridges over the implement and has sides extending alongside the implement sides. Supporting couplers connect the carrier sides to the implement sides with the rear portion of the carrier being adapted for vertical movement for coupling and uncoupling to the implement.

35 Claims, 11 Drawing Figures

INVENTORS
VERNON E. RETTIG,
JOHN E. MAUST, JR. &
JOSEPH J. SHINDELAR

Patented Feb. 29, 1972

INVENTORS
VERNON E. RETTIG,
JOHN E. MAUST, JR. &
JOSEPH J. SHINDELAR

Patented Feb. 29, 1972  3,645,074

INVENTORS
VERNON E. RETTIG,
JOHN E. MAUST, JR. &
JOSEPH J. SHINDELAR

INVENTORS
VERNON E. RETTIG,
JOHN E. MAUST, JR. &
JOSEPH J. SHINDELAR 3,645,074

AGRICULTURAL IMPLEMENT

BACKGROUND OF THE INVENTION

It has heretofore been known to provide an implement carrier that is capable of supporting a variety of implements thereon. The most basic type of such implements is a tractor which may be adapted to carry any of several implements. In the carrier implement type of harvesting device, there is normally provided a relatively small carrier or tractor with a comparatively low-capacity crop-treating unit attached thereto. The implement is therefore of comparatively lightweight and the coupling and uncoupling of the implement from its main carrier is relatively simple. In most instances, the implement may be attached by manual means and in some instances, hydraulic units are used to raise and lower the implement into aligned positions with the supporting coupler members on the tractor or carrier.

When it is desired to have large capacity implements, it is, of course, necessary to have complementary large traction or carrier units. The means of detaching and attaching the implement on the carrier must also be somewhat complicated and there must be provided means for aligning the supporting couplers between the implement and tractor as well as the drive mechanism between the implement and tractor. Also, since high-capacity implements require large material containers that receive the treated crop, provision must also be made on the carrier for supporting a large box or container thereon.

SUMMARY OF THE INVENTION

With the above in mind, it is a primary object of the present invention to provide an implement-carrier combination in which the implement may be detached from the carrier and, of course, the carrier is capable of supporting one of many implements thereon.

Specifically, it is an object of the invention to provide an implement with supporting stands that permit it to be supported on the ground. The implement has a relatively long, narrow lower section and a comparatively wide upper section that projects to opposite sides of the lower section at the rear portion of the lower section. The carrier or tractor is supported on front and rear pairs of supporting wheels and has a front transverse portion that overlies the front, narrow, lower section on the implement and has depending portions that are positioned alongside the front portion of the implement and are connected at their lower ends to the front supporting wheels. The depending portions are also provided with coupling means that connect the front end of the implement to the tractor.

The rear portion of the carrier or tractor is supported for vertical movement on the rear support wheels. Rearwardly projecting and transversely spaced-apart portions extend from the front transverse portion of the carrier in underlying relation to the outwardly projecting portions of the upper section of the implement. Downwardly facing coupling elements are provided on the implement and upwardly facing complementary coupler elements are provided on the rearwardly projecting portions of the carrier. Power means are provided between the rear wheels and the rearwardly projecting portions of the carrier to raise and lower the portions and its coupler elements into and out of coupled and uncoupled positions with those on the implement.

It is still a further object of the present invention to provide a novel means for supporting the rear portions of the carrier on its support wheels that includes an arm for each wheel carried on a horizontal pivot on the carrier. A hydraulic unit is provided for each arm and extends between the carrier and arm. By extending and retracting the hydraulic units, the carrier is raised and lowered on the respective wheels. Also, in operation, the cylinders may be used to ensure ground contact with the rear wheels. This is important since it is desirable to have ground contact to ensure proper steering, traction and weight-carrying capabilities.

DESCRIPTION OF THE PREFERRED EMBODIMENT

Figure 1:
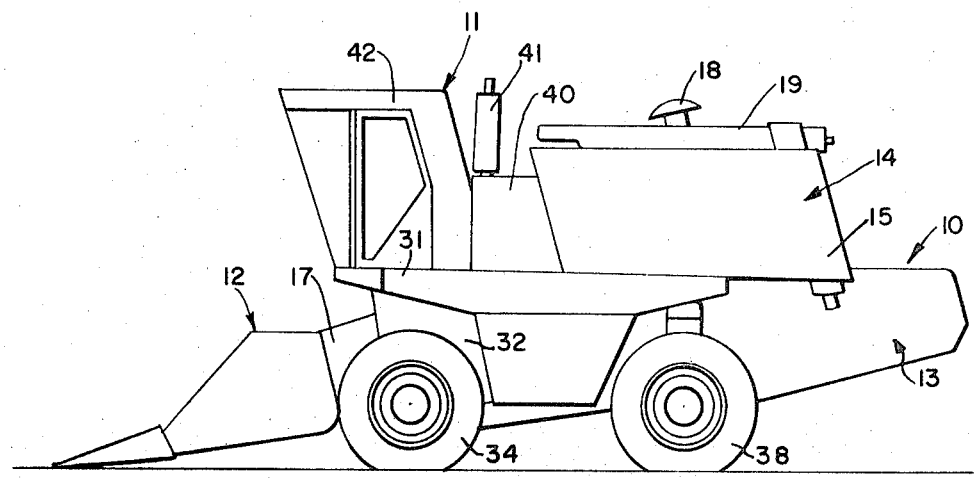
FIG. 1 is a side view of the carrier, implement and forwardly positioned harvesting unit.
Figure 2:
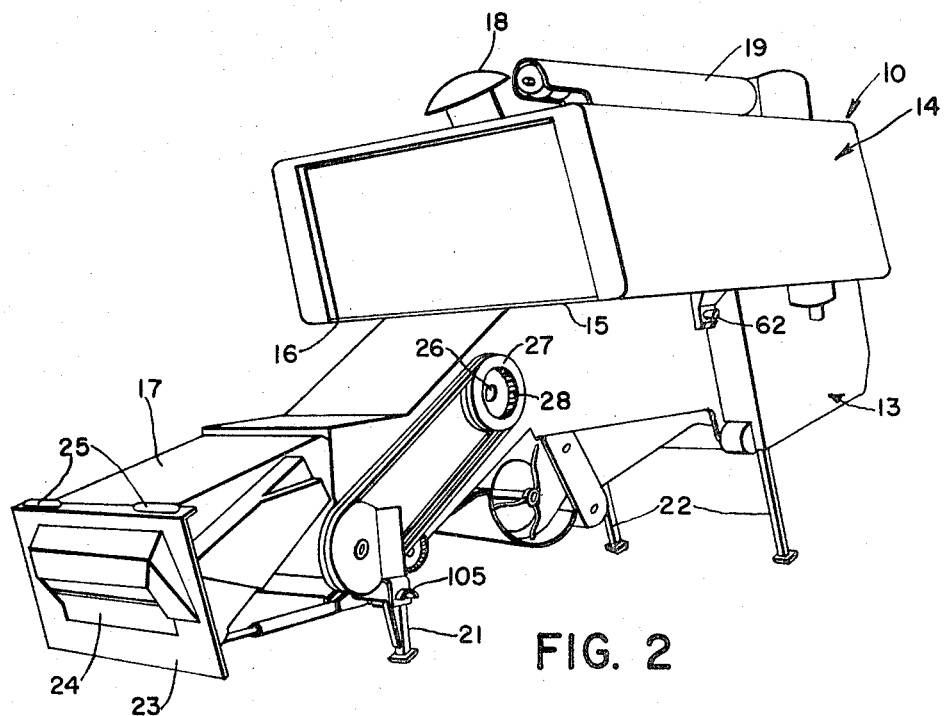
FIG. 2 is a front left side perspective view of the implement shown on its supporting stands.
Figure 3:
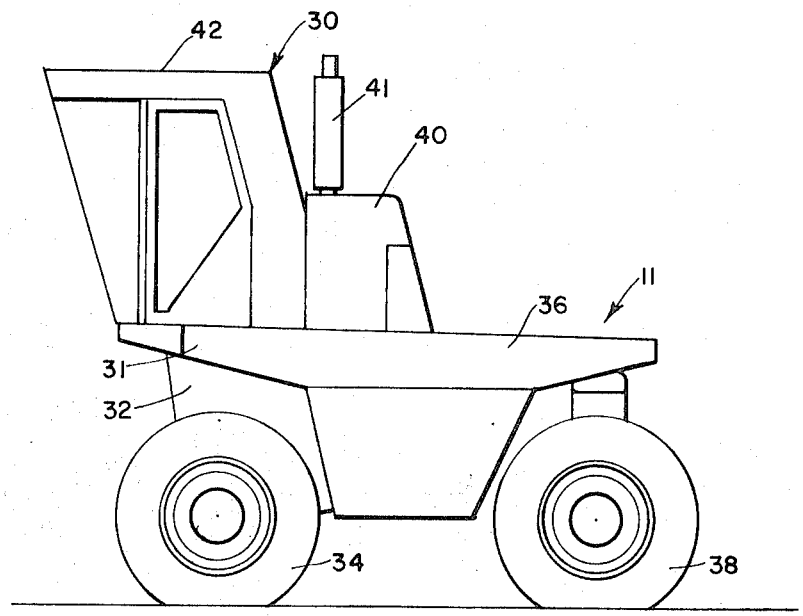
FIG. 3 is a side view of the carrier.
Figure 4:
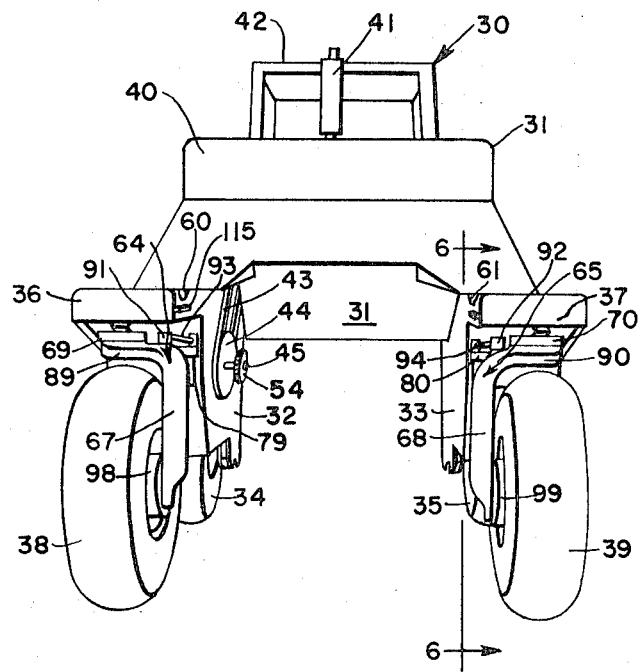
FIG. 4 is a rear perspective view looking into the carrier.
Figure 5:
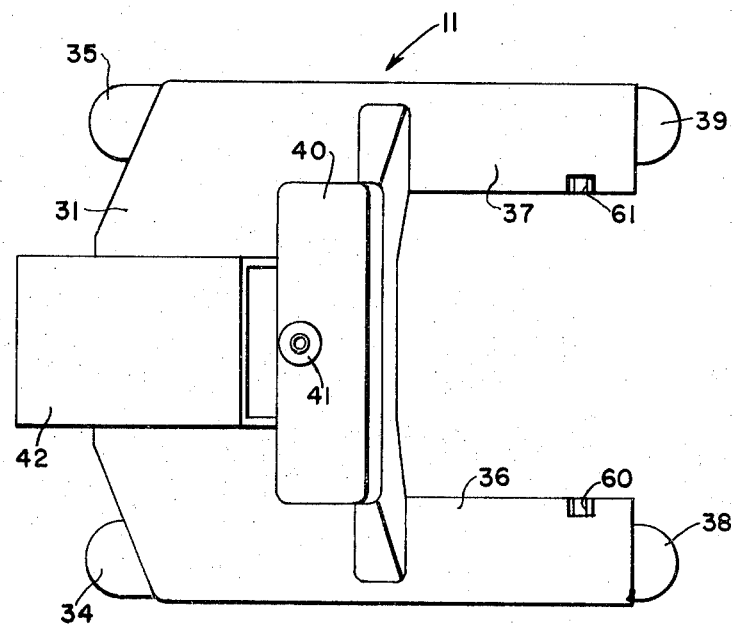
FIG. 5 is a plan view of the carrier.

Referring now to FIG. 1, in its completely assembled position, the implement carrier is composed of a basic implement 10, an implement carrier 11 and a forwardly positioned crop harvester device 12. The crop-treating implement 10 is composed of a lower section 13, elongated in a fore-and-aft direction and comparatively narrow as compared to an upper section 14, the latter having outwardly projecting portions 15, 16 extending to opposite sides of the lower portion 13. The lower portion 13 has a front portion 17 projecting forwardly of the upper section 14. In the present instance, the crop-treating implement is of a corn-shelling type, details of which are unimportant for the present, that is contained in the housing of the lower section 13. The upper section 14 is composed of a large grain-receiving tank that receives shelled corn from the lower section 13 by a conveyor device, indicated in its entirety by the reference numeral 18. A discharge conveyor device, indicated by the reference numeral 19, is provided for the purposes of discharging crop from the tank of the upper section 14. The implement 14 has front and rear retractable supporting stands 21, 22 respectively that may be lowered to support the implement on the ground, such being shown in FIG. 2. The implement 14 terminates at its forward end in an upright plate 23 that has a centrally located crop inlet 24 and a pair of upwardly projecting lugs 25 on its upper edge. The plate 23 and lugs 25 are insertable in a rear portion of the implement 12 in a manner identical to that shown in U.S. Pat. 3,270,489 to Rohwedder issued on Sept. 6, 1966 and reissued as Re. 26,512 and in a manner permitting the harvester to be mounted forwardly of and project outwardly of front support wheels 34, 35 of the carrier. Reference may be had to that patent for showing the specific details of the connection between the plate 23 and the harvester 12. The implement 14 has its operating mechanism driven from a main input shaft 26 extending transversely across the implement and having fixed at its outer left-hand end a pulley 27 having internal teeth 28. As will later become apparent, power is introduced into the implement through the main input shaft 26.

Figure 7:
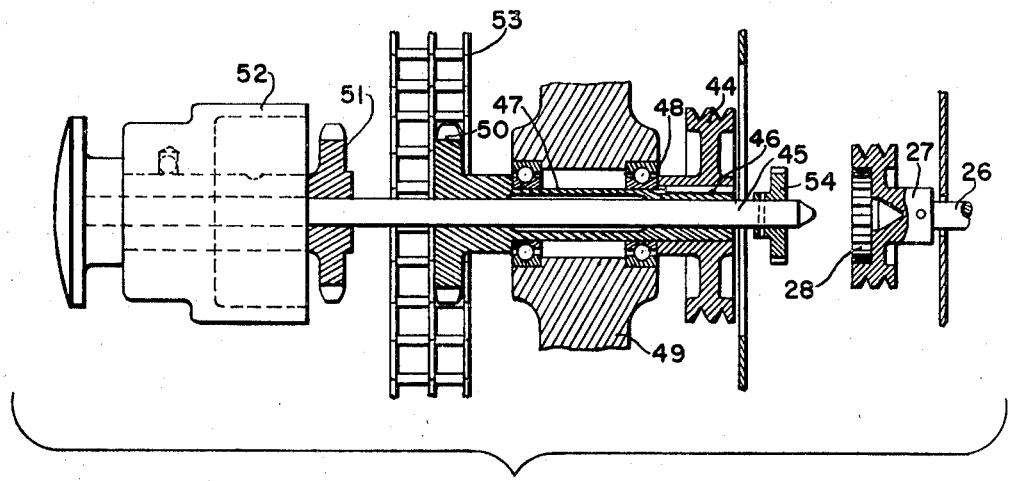
FIG. 7 is a vertical sectional view showing a portion of the drive mechanism and the coupling assembly for the drive mechanism between the implement and its carrier.

The implement carrier or tractor 11 is composed of a body portion 30 having a forward transverse portion 31 that bridges over the forward portion 17 of the implement. Depending from the transverse portion 31 is a pair of vertical portions 32, 33 that are positioned inwardly of and connected to front support wheels 34, 35. Extending rearwardly from the transverse portion 31 is a pair of horizontal portions 36, 37 positioned to underlie the outwardly projecting portions 15, 16 of the implement. The rearwardly projecting portions 36, 37 also overlie a pair of rear transversely spaced wheels 38, 39. The carrier 11 has a main engine power source indicated in its location by the engine housing 40 and the vertical exhaust pipe 41. The engine 40 is just rearwardly of an operator's station 42. The engine 40 has a belt drive, indicated only partially at 43, that extends downwardly to a pulley 44 on a transverse drive shaft 45 which is axially coextensive with the shaft 26 when the implement is properly mounted on the carrier. The pulley is mounted to rotate on the shaft 45 and is fixed at 46 to rotate with a sprocket hub 47 concentric with the shaft 45 and having an outer surface journaled at 48 on a support 49 fixed to the depending body portion 32. The hub 47 has rigid therewith a sprocket 50. As may best be seen from viewing FIG. 7, the shaft 45 is mounted to shift axially in the hub portion 47. The shaft 45 carries a second sprocket 51 and a flanged collar 52 that is axially shiftable on the shaft 45 to overlie the sprocket 51. The drive between the sprockets 50, 51 is accomplished by first shifting the sprocket 51 adjacent the sprocket 50 and wrapping a free length of double chain 53 around the sprockets. The collar 52 is then shifted over both the sprockets 50, 51 and the chain 53 is held in engagement with the teeth of both sprockets 50, 51. In this manner, when the engine drives the pulley 44, a rotation of the shaft 45 occurs. On the inner side of the shaft 45 is a gear 54 that is axially shiftable to mesh with the teeth 28 on the implement pulley 27. Thus, when the two sprockets 50, 51 are positioned to be driven, the gear 54 will be axially shifted into engagement with the teeth 28 on the implement input shaft 26.

As may be seen from viewing FIGS. 1 and 3–5, the transverse portions 30 form with depending portions 32, 33 a downwardly opening space and with the rearwardly projecting portions 36, 37 a rearwardly opening space through which the lower portion 13 of the implement may extend. In its final disposition, as seen in FIG. 1, the upper section of grain tank 14 is directly rearwardly of the cab 30 and engine 40. The rearwardly projecting portions 36, 37 are provided with upwardly opening notches 60, 61 on their upper sides. The notches 60, 61 flare outwardly and upwardly to make it easier to receive transversely inwardly projecting rods 62, 63 that are rigid with the sides of the implement and project from opposite sides of the lower portion 13. The respective portions 36, 37 are raised and lowered on respective rear traction wheels 38, 39 which in turn are connected to the respective portions by means of rearwardly projecting arms 64, 65 mounted on transverse horizontal trunnions or pivots such as is indicated in dotted representation at 66 in FIG. 6. The arms 64, 65 include vertical portions 67, 68 that have their lower ends supported directly on the wheel axles of the wheels 38, 39 and fore-and-aft extending horizontal portions 69, 70. Extending between the rearwardly projecting portions 36, 37 and the fore-and-aft extending portions 69, 70 respectively are hydraulic cylinders 72, 73. Suitable structural framework as at 75 is provided on the respective portions 36, 37 to support the cylinders 72, 73.

Supported on horizontal portions 69, 70 of the arms 64, 65 are vertical pivots 78 carrying horizontal steering levers 80. Extending between the midpoints of the levers 80 and their respective frameworks 75 are second cylinders 82 respectively having their ram ends connected to vertical pivot pins 84 respectively on the levers, and their cylinder ends connected to vertical pivots 85, 86 on the respective frameworks. The vertical portions 67, 68 are connected to the horizontal rearwardly projecting portions 69, 70 by means of vertical trunnions, one of which is shown at 87 on the right rear wheel 39, which permits the lower portions 67, 68 and their respective wheels 38, 39 to steer relative to the tractor. As may best be seen from viewing FIG. 4, the vertical portions 67, 68 are L-shaped and have laterally extending arms that reach outwardly to the respective vertical trunnions.

On the upper side of the horizontal legs 89, 90 are upright pivot members 91, 92 that receive the rear ends of links 93, 94 that extend forwardly and are connected at 95, 96 to the innermost ends of the steering levers 79, 80. As may therefore become clearly apparent, the respective rear wheels 38, 39 are turned by the extension and retraction of the extensible and retractable hydraulic links or cylinders 82. Also, raising and lowering of the rearwardly projecting portions 36, 37 of the housing structure is accomplished by raising and lowering the portions on the respective rear wheels 38, 39 by extending and retracting the extensible and retractable links or hydraulic cylinders 71, 72. It should also become apparent that the purpose of raising and lowering the portions 36, 37 is to permit the tractor portion 11 to move rearwardly under the implement 10 while the portions 36, 37 are lowered and until the respective notches 60, 61 are beneath the lugs 62, 63, at which time the cylinders 72, 73 may be extended and force the lugs 62, 63 into the notches 61, 62.

Figure 8:
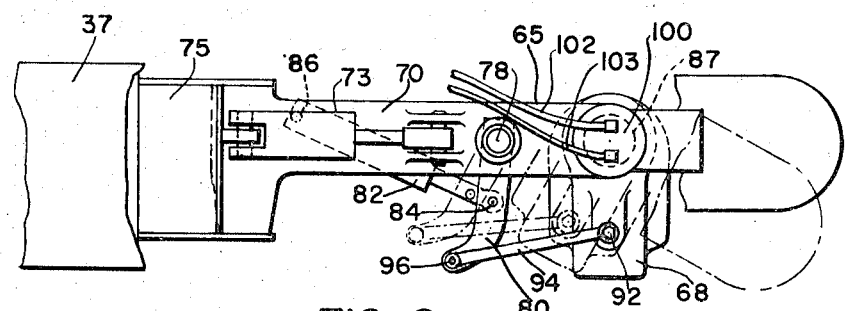
FIG. 8 is a plan view of the supporting structure for one of the rear wheels and as taken substantially along the line 8—8 of FIG. 6.

The wheels 38, 39 are driven by individual hydrostatic motors 98, 99. Fluid lines are fed to the respective motors 98, 99 through passages, not shown, in the vertical portions 67, 68. The swivel joints 87 are also a slip-type fluid manifold with a cap 100 fixed against movement and into which is connected a pair of hydraulic hoses 102, 103 (FIG. 8). The manifold permits the entire wheel structure 39 to swivel about its upright axis while permitting the movement or flow of fluid into the hydrostatic motor 99.

Fixed to and projecting outwardly from opposite sides of the lower section 13 of the crop-treating implement and adjacent its forward ends are downwardly opening V-shaped latch elements 105. Complementary to the latch elements 105 and supported on the lower ends of the vertical side portions 32, 33 are complementary latch means, indicated in their entireties by the reference numerals 106. Each latch means 106 includes a forwardly directed extensible and retractable link or hydraulic cylinder 107 having its forward rod end connected to one leg of a bellcrank 108 that is pivoted at 109 for fore-and-aft movement. The bellcrank has its forward end connected to a latch linkage that includes a vertical link 110 carrying an inwardly projecting latch pin 111 at its lower end and connected at its upper end to a fore-and-aft extending link 112. The link 112 is pivotally connected to the structural portion 33. The bellcrank 108 has a small link 113 that connects to the links 110, 112 at their pivotal connection. Fixed to the portion 33 at its underside and facing downwardly is a V-shaped cup 114 that is adapted to receive the V-shaped latch 105. There is provided, as previously mentioned, a latch means 106 on each of the depending portion 32, 33 of the tractor.

Figure 6:
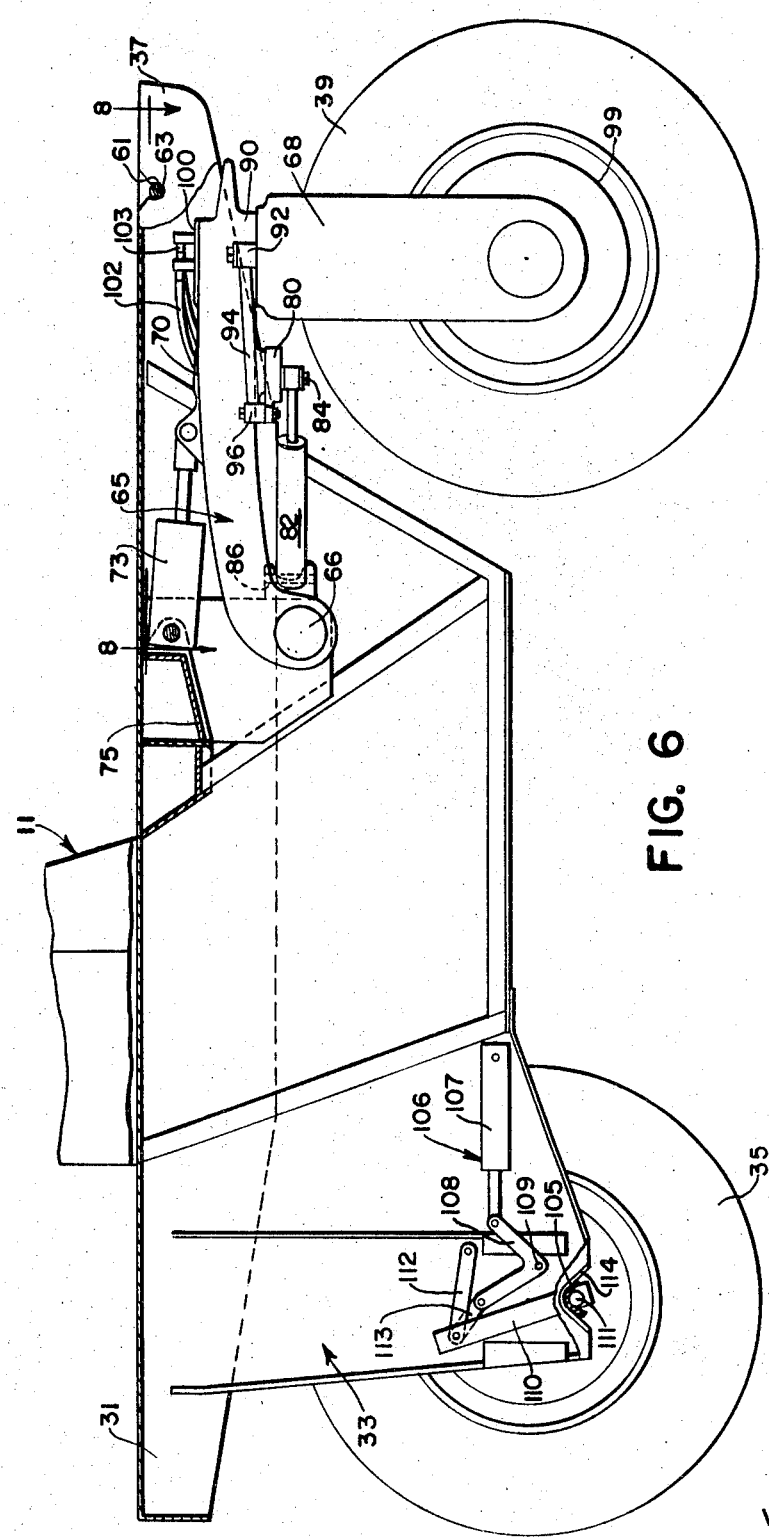
FIG. 6 is a side view of the lower portion of the carrier with portions removed to show internal mechanisms and as taken substantially along the line 6—6 of FIG. 4.

As may become clearly apparent from viewing FIG. 6, the forward end of the lower section 13 of the implement may be raised and lowered into its mounted position by extending and retracting respectively the cylinder 107. When the implement latches 105 and their respective forward ends of the implement are in their raised or transport position, the hydraulic cylinder 107 is extended to a point where the forward arm of the bellcrank 108 and the link 113 provides an overcenter lock to thereby hold the latch member 105 into engagement with the cup 114.

Figure 9:
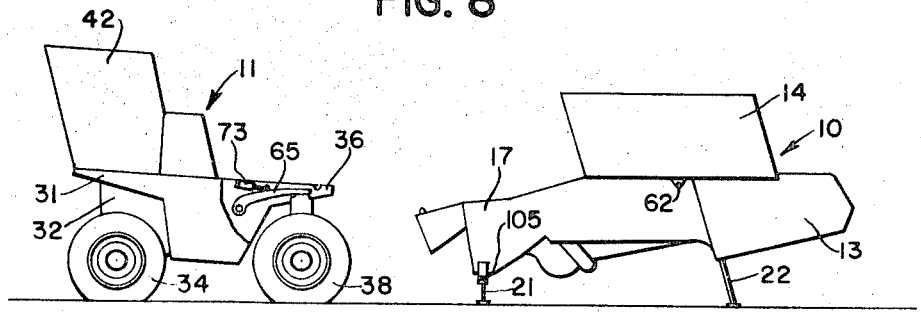
FIGS. 9, 10 and 11 are schematic views of the implement and the carrier in their completely detached positions, their position just prior to their being coupled together and in their coupled position. Portions of the structure are broken away to show the operation of internal mechanisms.
Figures 10, 11:
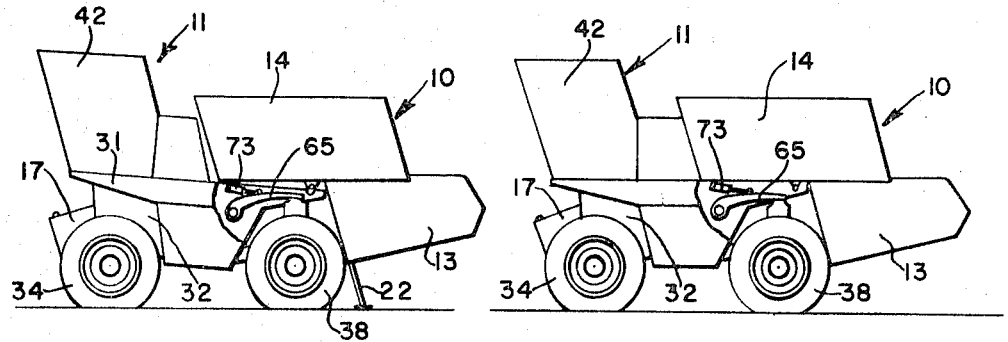

In understanding the method of mounting the implement on the tractor, reference should be made to FIGS. 9, 10 and 11. The implement 10 is supported on stands 21, 22 and the tractor 11 is driven forwardly of the implement. The rearwardly projecting portions 36, 37 are lowered by retracting the cylinders 72, 73 in the manner previously described. Also, the cylinders 107 are extended to cause the latches to be at a considerably lower level than the V-shaped latches 105 on the implement 10. The tractor is backed into position so that the sides 36, 37 underlie the outwardly projecting portions 15, 16 of the implement and so that the notches 60, 61 are directly beneath the lugs 62, 63 on the implement. At substantially the same time, the forward portion of the implement will be in proper position or so that the latch 105 is in substantial vertical alignment with the latch rod 111. An operator positioned in the cab of the tractor can judge the correct position by noticing how close the upper portion 14 of the implement is to the engine portion 40 of the tractor. When this occurs, the cylinders 72, 73 may be extended to raise the portions 36, 37 and lock the lugs or rods 62, 63 in the notches 60, 61. Likewise, the cylinders 107 may be extended to raise the rods 111 into engagement with the latches 105 and from there upwardly until the latches engage the downwardly opening cups 114. In this position, the implement will be mounted on the tractor substantially as shown in FIG. 11. The tractor 11 and implement 10 are then in a position to move in and connect to the harvesting unit 12 in the manner described in the previously referred to U.S. Pat. 3,270,489 and its Re. patent 26,512. It is also to be understood that suitable wear plates, such as at 115 and 116 are provided lengthwise and on the inner sides of the portions 32, 33 and 36, 37 to guide the implement in its proper position. It should also be noted that upon the implement being in its mounted position, the drive shaft 45 will be axially aligned with the implement shaft 26 so that the coupling arrangement previously described and shown in FIG. 7 may be engaged. Thus, the implement, tractor and harvester are ready to operate.

Another feature of this system is the ability to raise or lower the rear of the vehicle during field operation. This is convenient, and a desirable feature when operating up or down hill, inasmuch as the combine threshing portion or harvesting mechanism, which is attached to the propelling vehicle, can be more nearly maintained level which gives better efficiency of the combine shoe, thus reducing grain losses.

We claim:

1. A crop-handling implement comprising: an elongated fore-and-aft extending crop-treating implement; an implement carrier having front and rear transversely spaced wheels and a body structure composed of a forward transverse portion bridging over the forward portion of the implement and a pair of depending portions positioned on opposite sides of and closely adjacent the implement forward portion, the body structure further having a pair of rearwardly projecting portions extending from the transverse portion alongside and outwardly of the implement; means mounting the depending portions on the front wheels; means mounting the rearwardly projecting portions on the rear wheels; and detachable supporting couplers between the depending portions and the forward portion of the implement and between the rearwardly projecting portions and the implement.

2. The structure as set forth in claim 1 further characterized by the implement having an upper section rearwardly of the transverse portion of the implement carrier, the upper section having outwardly projecting portions overlying the rearwardly projecting portions of the carrier.

3. The structure as set forth in claim 1 in which the means mounting the rearwardly projecting portions on the rear wheels are adjustable to selectively raise and lower the portions; and further characterized by the detachable couplers between the rearwardly projecting portions and the implement being in part downwardly facing coupler elements on the implement and in part upwardly facing complementary coupler elements on the respective rearwardly projecting portions, and said coupler elements are engaged and disengaged when the rearwardly projecting portions are raised and lowered respectively.

4. The structure as set forth in claim 3 further characterized by the implement having a transverse main driven shaft and the carrier having a transverse drive shaft transversely alignable with the driven shaft when the couplers are coupled, and an axially shiftable drive coupler means for coupling adjacent ends of the shafts.

5. The structure as set forth in claim 3 further characterized by supporting stands for said implement for retaining the downwardly facing coupler elements above the upwardly facing coupler elements to permit detachment of the implement from the carrier.

6. The structure as set forth in claim 1 characterized by the means mounting the rearwardly projecting portions on the rear wheels being in the form of arms mounted on the respective rearwardly extending portions to swing vertically on horizontal axes and connected at their ends to the respective wheels; and extensible and retractable motors extending between the arms and the respective portions for raising and lowering the latter on the wheels.

7. The structure as set forth in claim 6 in which the couplers between the rearwardly extending portions and implement are separated upon the rearwardly extending portions being lowered and are coupled upon their being raised.

8. The structure as set forth in claim 6 in which the wheels are connected to the respective arms by vertical trunnions that permit the wheels to swivel about a vertical axis, and further characterized by power-steering mechanism forcing selective turning of the respective wheels.

9. The structure as set forth in claim 8 in which the power-steering means includes extensible and retractable hydraulic motors connected at one of their ends to the respective arms with means at the opposite ends for connecting them to the respective wheels.

10. The structure as set forth in claim 1 characterized by the couplers between the depending portions and the implement are downwardly facing coupler elements on the sides of the implement and complementary vertically movable and upwardly facing coupler elements on the depending portions; and power means on the depending portions for coupling of the respective coupler elements by raising the coupler elements on the depending portions and uncoupling by lowering them.

11. A crop-handling implement comprising: a crop-treating implement having an elongated relatively narrow fore-and-aft extending lower section and an upper section rigid with the lower section and having outwardly projecting portions extending to opposite sides of the lower section, and the lower section having a forward portion extending forwardly of the upper section; an implement carrier having front and rear transversely spaced wheels and a body structure composed of a forward transverse portion bridging over the implement forward portion and a pair of depending portions positioned on opposite sides of and closely adjacent the implement forward portion, the body structure further having a pair of rearwardly projecting portions in underlying relation to the outwardly projecting portions of the implement; means mounting the depending portions on the front wheels; means mounting the rearwardly projecting portions for vertical movement on the rear wheels; and couplers between the depending portions and the forward portion of the implement and between the rearwardly projecting portions and the implement, the latter being adapted for coupling and uncoupling upon raising the lowering respectively of the rearwardly projecting portions.

12. A crop-handling implement comprising: a crop-treating implement having an elongated relatively narrow fore-and-aft extending lower section and an upper section rigid with the lower section and having outwardly projecting portions extending to opposite sides of the lower section, and said lower section having a projecting forward portion extending forwardly of the upper section; implement supporting stands connected to the implement for suspending it above ground level; an implement carrier having front and rear transversely spaced ground wheels and a body structure composed of a forward transverse portion bridging over the implement forward portion and a pair of depending portions positioned on opposite sides of and closely adjacent the implement forward portion, the body structure further having a pair of rearwardly projecting portions extending alongside opposite sides of the lower section from the forward transverse portion and in underlying relation to the outwardly projecting portions of the upper section; means for raising and lowering the rearwardly projecting portions on the ground wheels; and couplers between the depending portions and the forward portion of the implement and between the rearwardly projecting portion of the carrier and the implement, the latter being adapted for coupling and uncoupling upon raising and lowering respectively of the rearwardly projecting portions.

13. A crop-handling implement comprising: an elongated fore-and-aft extending crop-treating implement; an implement carrier having front and rear transversely spaced wheels and a body structure composed of a transverse portion bridging over the implement and portions rigid with the transverse portion positioned on opposite sides of and closely adjacent the implement; means for raising and lowering the latter portions on the ground wheels; and couplers between the portions and the implement adapted for coupling and uncoupling upon raising and lowering respectively of the portions.

14. A traction carrier for an implement composed of a main body structure having a forward transverse portion supported over a pair of forward transversely spaced wheels, a pair of transversely spaced portions depending from the transverse portion closely adjacent and inwardly of the respective wheels and a pair of rearwardly projecting portions extending from the forward portion in transversely spaced relation and terminating above a pair of rear wheels, the depending portions and the rearwardly extending portions forming with the transverse portion downwardly opening and rearwardly opening aligned spaces respectively; means mounting the forward wheels on the respective depending portions; and means supporting the rearwardly projecting portions on each of the respective rear wheels composed of an arm mounted at one of its ends of a transverse horizontal pivot carried by the respective rearwardly projecting portions and connected at its opposite end to the respective wheel, and power means between the arm and rearwardly projecting portion for raising and lowering the respective portion on its respective wheel; and coupling means on the rearwardly projecting portions for coupling and uncoupling to an implement.

15. A traction carrier for an implement composed of a main body structure having a forward transverse portion supported over a pair of forward transversely spaced wheels, a pair of transversely spaced portions depending from the transverse portion closely adjacent and inwardly of the respective wheels and a pair of rearwardly projecting portions extending from the forward portion in transversely spaced relation and terminating above a pair of rear wheels, the depending portions and the rearwardly extending portions forming with the transverse portion downwardly opening and rearwardly opening aligned spaces respectively; means mounting the forward wheels on the respective depending portions; and means supporting the rearwardly projecting portions on the rear wheels for vertical adjustment thereon; power means for raising and lowering the portions on their wheels; and coupling means on the portions for coupling and uncoupling to an implement.

16. The structure as set forth in claim 15 in which the coupling means includes upwardly facing coupler elements that may be moved into coupling position upon raising of the portions and uncoupled upon lowering of the portions.

17. A traction carrier for an implement composed of a main body structure carried on supporting wheels and having a transverse portion and transversely spaced portions rigid with the transverse portion defining a gap for receiving an implement; means supporting the portions on the wheels for selective vertical movement including power means for raising and lowering the portions on the wheels; and coupling means on the portions for coupling and uncoupling to an implement in response to raising and lowering of the portions.

18. The structure as set forth in claim 17 in which the transverse portion is supported on forward transversely spaced wheels and the transversely spaced portions project rearwardly from the transverse portion to ends that are adjacent transversely spaced rear wheels; and the means for raising and lowering the portions are arms connected for vertical pivotal movement to the wheels and portions, and the power means are extensible and retractable hydraulic cylinders operatively connected to the arms and portions for angularly adjusting the arms.

19. The structure as set forth in claim 18 in which the wheels are connected to the arms to turn on vertical axes and further characterized for power means for selectively turning the wheels.

20. A traction carrier for an implement composed of a main body and having front and rear pairs of transversely spaced wheels, the body including a forward transverse portion supported over the forward wheels, and a pair of rigid sides extending from the transverse portion downwardly and rearwardly and forming with the transverse portion a downwardly and rearwardly opening implement receiving space; an operator's station and main power source supported on the transverse portion; a drive extending from the power source to a transverse drive shaft supported in one of the sides and adapted for connection to an implement shaft inwardly of the sides; means supporting the rear portion of said sides on the respective rear wheels composed of an arm mounted at one of its ends on a transverse horizontal pivot carried by the respective side and connected at its opposite end to the respective wheel; and power means between the arm and rearwardly projecting portion for raising and lowering the respective portion on its respective wheel.

21. A crop-handling implement comprising: a crop-treating implement having an elongated relatively narrow fore-and-aft extending lower section and an upper section rigid with the lower section and having outwardly projecting portions extending to opposite sides of the lower section, and said lower section having a projecting forward portion extending forwardly of the rear section; an implement carrier having front and rear transversely spaced wheels and a body structure composed of a forward transverse portion bridging over the implement forward portion and opposite transversely spaced sides extending downwardly and rearwardly closely adjacent opposite sides of the implement and in underlying relation to the outwardly projecting portions of the implement; means mounting the sides on the front wheels and the rear wheels for vertical movement relative thereto; and supporting couplers between the sides and the implement adapted for coupling and uncoupling upon vertical adjustment of the sides on the wheels.

22. A crop-handling implement comprising: a crop-treating implement having an elongated relatively narrow fore-and-aft extending lower section and an upper section rigid with the lower section and having outwardly projecting portions extending to opposite sides of the lower section, and said lower section having a projecting forward portion extending forwardly of the upper section; an implement carrier having a wheel-supported body structure composed of a forward transverse portion bridging over the implement forward portion and opposite transversely spaced sides extending downwardly and rearwardly of the transverse portion and defining therewith a downwardly and rearwardly opening space through which the lower section of the implement may extend with the outwardly projecting portions being in overlying relation to the sides; and detachable couplers between the sides and the implement.

23. The structure as set forth in claim 22 characterized by the sides being adjustably carried on the wheels of the carrier for vertical movement and power means for vertically adjusting the sides; and in which the couplers include coupler elements facing downwardly on the implement and complementary coupler elements facing upwardly on the sides in vertical alignment with implement coupler elements so that coupling and uncoupling may occur by raising and lowering the sides.

24. A crop-handling implement comprising: an elongated fore-and-aft extending crop-treating implement having opposite sides; a pair of downwardly facing coupler elements on the sides; an implement carrier composed of a main body having front and rear pairs of support wheels and a forward transverse portion extending over the implement at its forward end, the body further having a pair of transversely spaced sides extending downwardly and rearwardly and forming with the transverse portion a downwardly and rearwardly opening space upwardly facing; coupler elements vertically aligned with the aforesaid coupler elements supported on the carrier sides; means mounting the forward wheels on the respective carrier sides; and means supporting the implement sides on each of the respective rear wheels composed of an arm mounted at one of its ends on a horizontal pivot carried by the respective rearwardly projecting portion and connected at its opposite end to the respective wheel, and power means between the arms and respective implement sides for raising and lowering the sides for coupling and uncoupling the vertically aligned coupler elements.

25. A crop-handling implement comprising: an elongated fore-and-aft extending crop-treating implement having a relatively narrow elongated portion extending between front and rear ends and a wide upper portion projecting to opposite sides of the elongated portion adjacent its rear end; an implement carrier having front and rear transversely spaced wheels and a body structure composed of a forward transverse portion bridging over the forward portion of the implement and a pair of depending portions positioned on opposite sides of and closely adjacent the implement forward portion, the body structure further having a pair of rearwardly projecting portions extending from the transverse portion alongside and outwardly of the implement and beneath the upper portion of the implement; means mounting the depending portions on the front wheels; means mounting the rearwardly projecting portions on the rear wheels; detachable supporting couplers between the depending portions and the forward portion of the implement and between the rearwardly projecting portions and the implement; and a harvester detachably supported on the front end of the implement and projecting forwardly of the front wheels.

26. A crop-handling implement comprising: an elongated fore-and-aft extending crop-treating implement having front and rear ends; a crop receptacle above, rigid with, and having outwardly projecting portions extending to opposite sides of the implement and rearwardly of the forward end of the implement; an implement carrier having front and rear transversely spaced wheels and a body structure composed of a forward transverse portion bridging over the portion of the implement forwardly of the receptacle and depending and rearwardly projecting portions positioned on opposite sides of the implement and extending from the transverse portion alongside and outwardly of the implement in underlying relation to the outwardly projecting portions of the receptacle; means mounting the depending and rearwardly projecting portions on the front and rear wheels; detachable supporting couplers between the implement and the depending and rearwardly projecting portions; and a harvester detachably supported on the forward end of the implement and projecting outwardly of and forwardly of the front wheels.

27. The structure as set forth in claim 26 characterized by the carrier having a main power source and a transverse horizontal drive shaft means in one of its depending and rearwardly projecting portions; and the implement has a transverse horizontal main drive shaft means axially alignable with the drive shaft means of the carrier when the detachable supporting couplers are coupled; and a drive coupling between the respective drive shaft means.

28. The structure as set forth in claim 26 characterized by each of the rearwardly projecting portions being supported on the respective rear wheels by an arm horizontally pivotally mounted at one end thereon and connected at the opposite end to the wheel, and an extensible and retractable link extending between the rearwardly projecting portion and arm for raising and lowering the portion on the respective wheel.

29. The structure as set forth in claim 28 further characterized by each of said rear wheels being swiveled about an upright axis on the arm and further characterized by a hydraulic cylinder having means at one end for anchoring it to rearwardly projecting portions and means at the opposite end for anchoring it to the wheel whereby extension and retraction of the cylinders will steer the wheel.

30. The structure as set forth in claim 29 characterized by the respective rear wheels having individual hydrostatic drives and having fluid-transferring joints at the respective vertical swivels for transferring fluid to the respective drives at said joints.

31. A crop-handling machine comprising: a main frame having an elongated fore-and-aft extending crop-treating device supported thereon; a pair of support wheels supporting the forward end of the frame; a rear pair of support wheels; and means supporting a rear portion of the frame on the respective rear wheels, said latter means comprising an arm mounted at one of its ends on a horizontal pivot carried by the frame; and vertical pivot means connecting the respective arm to a respective rear wheel; first adjustable power means between the arms and frame for raising and lowering the frame; and second adjustable power means between the arms and wheels for steering the latter on the vertical pivot means.

32. The structure as set forth in claim 31 in which the first adjustable power means is an extensible and retractable hydraulic motor connected to the respective arms and frame.

33. The structure as set forth in claim 31 in which the second adjustable power means is a hydraulic motor for each of said rear wheels with a part thereof connected to the respective arm and a part thereof operatively connected to the wheel for turning the latter.

34. The structure as set forth in claim 31 further characterized by each of said rear wheels having its own hydraulically operated individual motor for driving the wheel inwardly of and alongside the respective wheel, said vertical pivot means includes a vertical trunnion having a slip-type fluid manifold permitting transfer of hydraulic fluid to and from the respective motor at said trunnion.

25. A crop-handling machine comprising: a main frame having an elongated fore-and-aft extending crop-treating device supported thereon; a pair of support wheels supporting the forward end of the frame; a relatively long and heavy crop-harvesting mechanism cantilevered forwardly of the frame and the front wheels and feeding into the crop-treating device; a rear pair of support wheels; and means supporting a rear portion of the frame on the respective rear wheels, said latter means comprising an arm mounted at one of its ends on a horizontal pivot carried by the frame; and vertical pivot means connecting the respective arm to a respective rear wheel; first adjustable power means between the arms and frame for raising and lowering the frame; and second adjustable power means between the arms and wheels for steering the latter on the vertical pivot means.

* * * * *